(No Model.)
E. P. ELY.
MACHINE FOR THE PRODUCTION OF WOOD PULP.
No. 309,532. Patented Dec. 23, 1884.
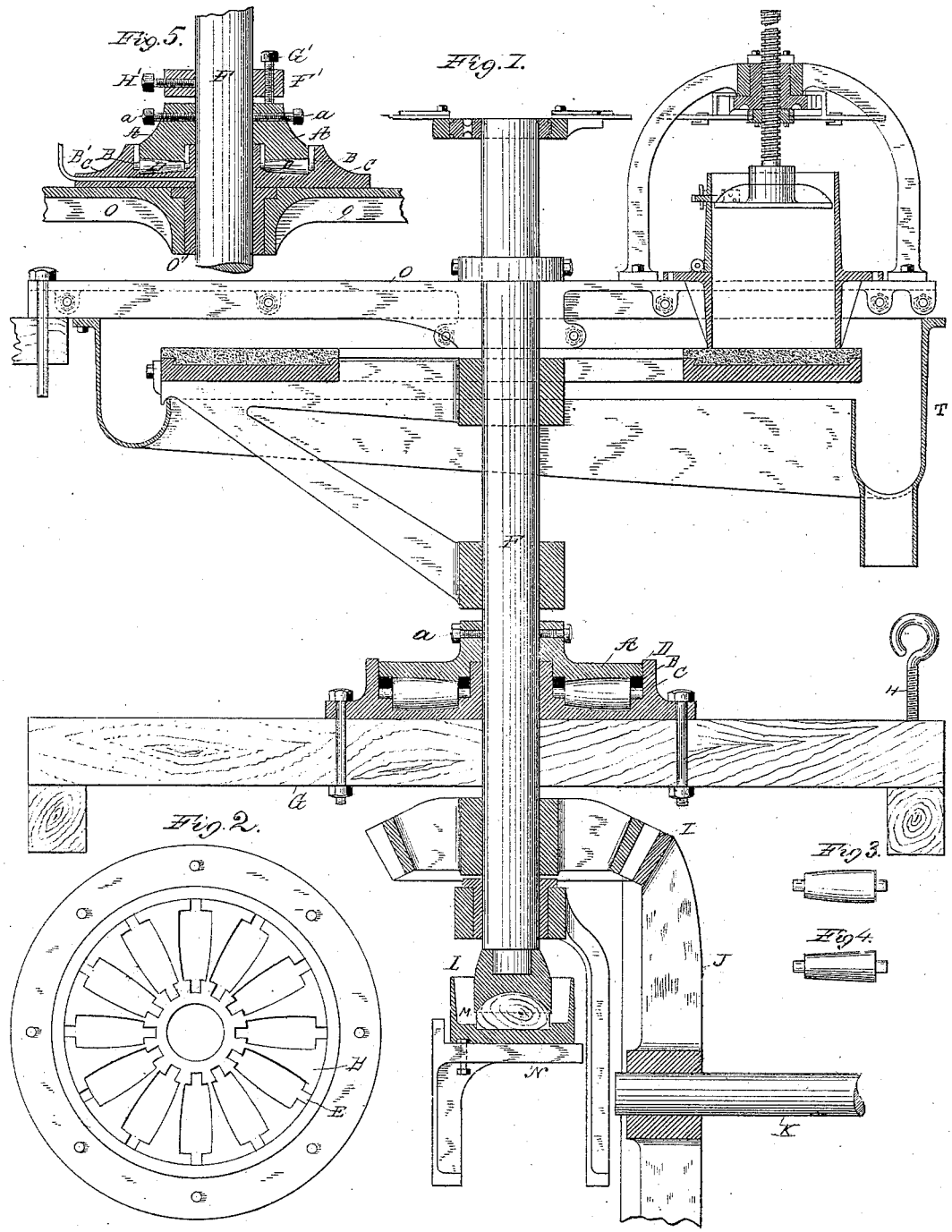
Witnesses:
Gabriel J. W. Galster
Herbert Knight
Inventor:
Edward P. Ely
by Knight Bros
Attorneys

UNITED STATES PATENT OFFICE.

EDWARD P. ELY, OF SOUTH WALLINGFORD, VERMONT, ASSIGNOR TO ALEXANDER H. RITCHIE, OF NEW YORK, N. Y.

MACHINE FOR THE PRODUCTION OF WOOD PULP.

SPECIFICATION forming part of Letters Patent No. 309,532, dated December 23, 1884.

Application filed March 31, 1884. (No model.)

*To all whom it may concern:*

Be it known that I, EDWARD P. ELY, a citizen of the United States, and residing at South Wallingford, Vermont, have invented certain new and useful Improvements in Wood-Pulp Machines, of which the following is a specification.

My present invention relates to improvements on my former applications filed on the 24th of October, the 7th of November, and the 11th of December, 1883, the serial numbers of which are 109,898, 111,086, and 114,201, respectively; and it consists, chiefly, in an anti-friction bearing for the main vertical shaft or spindle, as hereinafter described.

In the drawings which form a part of this specification, Figure 1 represents a vertical section of my wood-pulp grinder. Fig. 2 is a plan view of a loose roller-guide employed by me in my improved anti-friction bearings. Figs. 3 and 4 show different forms of the rollers. Fig. 5 is a cross-section of my anti-friction device, showing it resting on the cover of the pulp-trough. Other modifications are shown in this view, which will be hereinafter specifically referred to.

Around the spindle F, and above and upon the cover O of the trough T of the machine, or between the grinding portion of the machine and the adjustable step described and claimed by me in the last application above referred to, I place a collar, A, rigidly fastened to said spindle by means of screws $a$. The collar A revolves with the spindle F and travels on the anti-friction rollers D, arranged beneath it. These rollers D (shown in detail in Figs. 3 and 4, and in cross-section in Fig. 1) are provided at both ends with suitable journals, which fit and are adapted to rotate in the pockets or apartments E of the guide B. This latter I term a "loose roller-guide," and it, together with the rollers D, which it contains, is adapted to rotate around the spindle F. A box, C, supported on a bearing, G, as shown, is filled with oil or other suitable fluid. In this oil-box C, I place the loose roller-guide B. The rollers D as they rotate bear upon the bottom of the oil-box C. The said rollers are made, preferably, of hardened steel. The pockets or apartments E of this loose roller-guide B are only for the purpose of retaining the rollers in relative position, and to prevent them from interfering with each other during the operation of the machine and while the roller-guide is moving around the spindle. As stated, the rollers D turn upon the bottom of the oil-box C, and the collar A in like manner travels on the rollers aforesaid.

As referred to above, and as shown in the drawings, the loose roller-guide will ordinarily and under sufficient pressure revolve around the spindle. This movement will relieve the rollers from any strain, and permit a free motion in all the rolling parts.

Upon the lower end of the spindle or main shaft of the machine is the cap L, which rests and turns upon the step M. The latter is situated within the water-box N, which is supported by means of brackets, or in any other suitable manner. I have found at times that there is too much friction between the surfaces of contact of the step and the cap of the spindle, and it is to obviate this that I have provided the above-described anti-friction device. The said device may rest on a bearing, G, and as shown in Fig. 1, the bearing being provided with a screw, H, for adjusting the position of the spindle, or it may be placed on the cover or table O of the pulp-trough, as shown in Fig. 5. I prefer placing it, however, in the latter position. The table or cover O, as shown in Fig. 5, is provided with a brass bushing, O'. The pipe B' extends through the oil-box C, to carry lubricating-oil to this bushing. In this drawing, also, F' represents a collar fastened to the main shaft F by means of three or more set-screws, H'. Vertical set-screws G are also placed in this collar. The object of this arrangement is to raise the spindle or shaft F off of the step M. In doing this the screws $a$ of the collar A are loosened, when the screws G' may be turned, raising the spindle to any desired height. The spindle may be lowered in the same way merely by reversing the screw G'. When it has been adjusted as desired, the screws $a$ are replaced. It will thus be seen that the weight upon the step and the consequent friction may be easily regulated.

Having thus described my invention, what I claim as new therein, and desire to secure by Letters Patent, is—

1. In a wood-pulp machine, an anti-friction device for taking the weight of the spindle off its lower bearings, as set forth.

2. In a wood-pulp machine, the combination of the spindle F and the collar A, having set-screws $a$, with the anti-friction rollers D, having bearings, substantially as and for the purposes set forth.

3. In a wood-pulp machine, the combination of the spindle F and the collar A with the oil-box C and the rollers D, as and for the purposes described.

4. In a wood-pulp machine, the combination of the spindle F and the collar A with the oil-box C, the rollers D, and the loose roller-guide B, as and for the purposes set forth.

5. In a wood-pulp machine, the combination of the spindle F and the anti-friction device, as hereinbefore described, with the step M, as set forth.

6. In a wood-pulp machine, the combination of the spindle F, the anti-friction device, and the bearing G, having a screw, H, with the step M, as and for the purposes described.

7. In a wood-pulp machine, the combination of the spindle F, having a collar, A, and set-screws $a$, with the collar F' and the set-screws G' and H', as and for the purposes set forth.

EDWARD P. ELY.

Witnesses:
GEO. HOPKINS,
LEWIS LAW.